H. M. PLAISTED.
CAGE FOR GRINDERS.
APPLICATION FILED JUNE 11, 1919.

1,359,426. Patented Nov. 16, 1920.

Inventor
Harold M. Plaisted.
by Mason Fenwick & Lawrence
Attorneys.

UNITED STATES PATENT OFFICE.

HAROLD M. PLAISTED, OF ST. LOUIS, MISSOURI, ASSIGNOR TO WILLIAMS PATENT CRUSHER & PULVERIZER CO., OF ST. LOUIS, MISSOURI, A CORPORATION OF MISSOURI.

CAGE FOR GRINDERS.

1,359,426. Specification of Letters Patent. Patented Nov. 16, 1920.

Application filed June 11, 1919. Serial No. 303,348.

*To all whom it may concern:*

Be it known that I, HAROLD M. PLAISTED, a citizen of the United States, residing at St. Louis, State of Missouri, have invented certain new and useful Improvements in Cages for Grinders, of which the following is a specification.

This invention relates to certain new and useful improvements in cages for grinders, the peculiarities of which will be hereinafter described and claimed.

The main object of my invention is to provide a cage that will effect in conjunction with rotary hammers, a shearing action on the material being ground; secondly that will provide ample discharge openings through the cage; and thirdly, that will spread the material laterally from the center.

Figure 7:
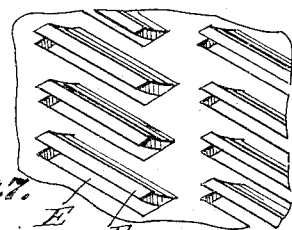
Figure 6:
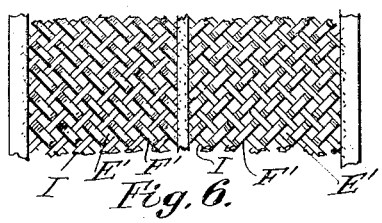
Figure 5:
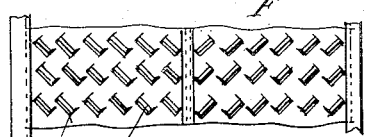
Figure 4:
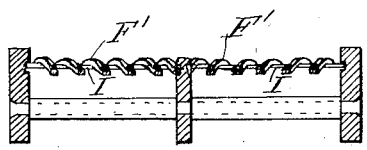
Figure 3:
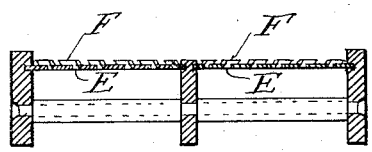
Figure 1:
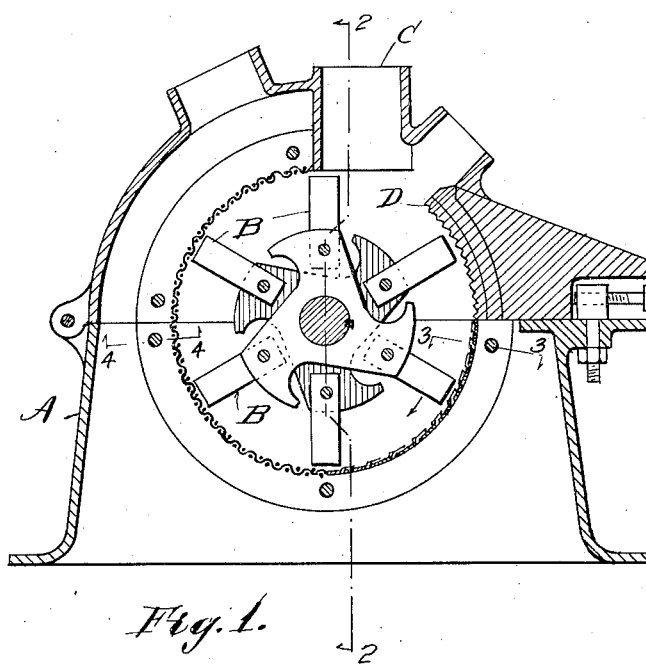
Figure 2:
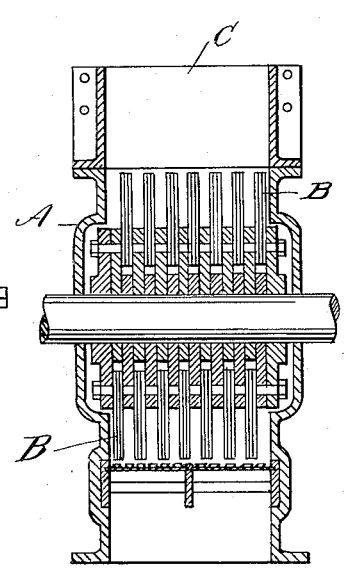

In the accompanying drawing on which like reference letters indicate corresponding parts:

Figure 1 represents a sectional elevation across the rotor shaft of a grinder exemplifying my invention; Fig. 2 a similar sectional elevation parallel to the shaft: Fig. 3 an enlarged section on the line 3—3 of Fig. 1; Fig. 4 a similar section on the line 4—4 of Fig. 1; Fig. 5 an enlarged plan view of a portion of the cage of which the section is shown in Fig. 3; Fig. 6 a similar enlarged plan view of a portion of the cage of which the section is shown in Fig. 4; Fig. 7 a still more enlarged detail plan view in perspective corresponding to Fig. 5; and Fig. 8 a similarly magnified perspective view of part of the screen shown in Fig. 6.

Figure 8:
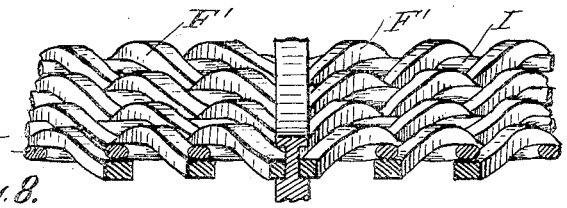

The letter A designates a suitable casing and B the hammers of a rotor mounted in said casing, and operating in conjunction with a cage made according to my invention to grind the material delivered to said casing through the hopper inlet C. Following the breaker plate D, the cage proceeds around and preferably over the rotor till it meets the wall of the inlet opening C. This cage consists of a series of openings which vary in form and arrangement according to the construction of the cage of plate, or of reticulated wire. When the plate form is used said openings E in the plate, Figs. 5 and 7, are elongated slots diagonally disposed with regard to the plane of rotation and provided at their far side edge (with respect to the direction of movement of said hammers B) with inward sharp edge projections, the cutting edges F of which are likewise diagonally arranged with regard to the plane of rotation of said hammers, whereby a shearing action is effected upon the material being ground between said hammers and said cutting edges. The openings E being directly adjacent and in front of said cutting edges, favor the discharge of the material as soon as it is acted on by the hammers and shearing projections. As shown in the cross section view Fig. 3, these inward projections diverge laterally from the central plane of rotation so that their cutting edges not only shear the material between the hammers, but also deflect the material laterally from the central plane. In grinding dry material, the supply from the hopper has a tendency in the usual form of cage, to collect to a greater extent in the middle of the cage instead of at the sides of the casing; it is to avoid this tendency to locate in the middle zone of rotation that I have arranged the shearing projections F, as shown in Figs. 3 and 5, diverging in opposite directions, which thus tend to spread the material over the cage and equalize the grinding action. In ordinary forms of cages made of plate material having perforations or openings, it has been found that the discharge of material through said openings tends to wear away the adjacent portions of the plate. In my form of plate with the projections F, this wearing action will tend to maintain the sharpness of the shearing edges and in fact will have a self-sharpening action on said projections. While I have shown the projections F as applied to a plate cage in Figs. 3, 5 and 7, I have also illustrated in Figs. 4, 6 and 8 a reticulated cage in which the wires are of two sizes,— the larger size being square or otherwise provided with angular cutting edges F' and crimped to project beyond the plane of the smaller cross wires I forming the general plane of the discharge openings between the wires. These projections F' it will be noted, are likewise diagonally disposed with regard to the plane of the rotation of the hammers, since the larger square wires forming said projections extend in a curved shape from one opening E' to the next opening, and are at their maximum projection in the middle of their length where they cross the smaller wires I. The perspective view in Fig. 8 shows most clearly the arrangement of these projecting angular wires and their disposition in opposite diagonal directions from the central plane of rotation corresponding to the similar arrangement of the projections F in Fig. 5. The material will thus be spread laterally and prevent the tendency to collect at the center zone of rotation as previously described.

In Fig. 1, I have shown the perforated plate cage of Figs. 3, 5 and 7 in the first quadrant of the cage following the breaker plate D, and the reticulated form of cage shown in Figs. 4, 6 and 8 as forming the balance of the cage, since such forms may be used in conjunction with the hammers and following one another as shown. In both forms however it will be noted that the shearing projections are diagonally disposed to the plane of the rotation of the hammers, and are similar in their effect upon the material except in the degree of cutting action due to the inclined sharpened cutting edges F of Fig. 7 being greater than the square angular cutting edges of the projections F' rounded in the direction of their length.

I may combine the two forms of cages in one cage as shown in Fig. 1, or I may make the cage wholly of the plate form or wholly of the wire screen form according to the material to be ground. In either case I do not claim the forms *per se*, but do claim them in conjunction with rotary hammers producing such improved shearing grinding action on the material fed to the grinder, as above described. The relatively larger wire of square or other angular cross section, is double crimped and thereby projects considerably above the plane of the smaller wires running in the opposite direction in the reticulated wire screen form. A single discharge opening is provided in front of each projection in the plate form, and a pair of such openings is provided in the reticulated wire form,—the smaller wire in the latter form dividing each pair and the angular wire having its greatest projection midway of the pair of openings in front of each projection.

I claim:

1. The combination with rotary hammers, of a cage having discharge openings therethrough, and inward projections at the far side of said openings with respect to the coöperative movement of the hammers, said projections having their edges diagonally disposed with respect to the planes of rotation of the hammers, whereby said edges effect a shearing action in coöperation with said hammers.

2. The combination with rotary hammers, of a cage having discharge openings and inward cutting projections,—the length of each projection being curved from one opening to an adjacent opening and diagonally disposed to the plane of rotation of the hammers for shearing action and having maximum projection midway of each pair of openings substantially as described.

3. The combination with rotary hammers, of a wire screen cage consisting of angular wire and relatively small wire, the angular wires and relatively small wires crossing each other diagonally to the plane of the rotation of hammers,—the larger angular wire being crimped and disposed so as to form shearing projections adapted to act in conjunction with said hammers, substantially as described.

4. The combination with rotary hammers, of a cage having inward cutting projections that operate in conjunction with said hammers to produce a shearing and deflecting action on the material being ground,— the length of said projections being diagonally disposed to the plane of rotation of said hammers and diverging laterally from the middle zone of rotation to distribute the material,—said cage having openings on that side of the projections that faces the approaching hammers for the discharge of the material being reduced by the combined action of said projections and said hammers.

5. The combination with rotary hammers, of a cage having discharge openings therethrough, and inward projections at the far sides of said openings with respect to the directions of movement of said hammers, said projections having their edges disposed adjacent to the cylindrical surface described by the outer ends of the hammers and extending transversely with respect to the planes of rotation of the hammers, said edges constituting cutting edges coöperating with the hammers.

In testimony whereof I have affixed my signature.

HAROLD M. PLAISTED.